Jan. 21, 1964   J. V. FREDD   3,118,682
ELASTIC SEAL WITH EXPANDABLE BACK-UP MEMBER
Filed May 5, 1961
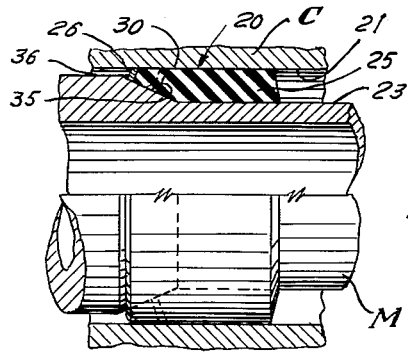
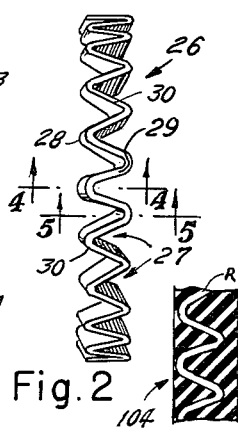
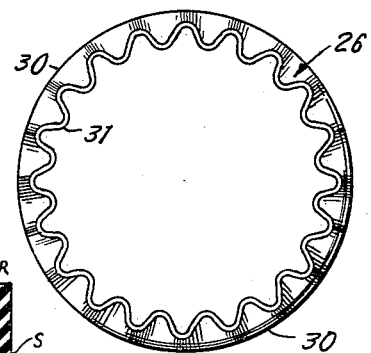
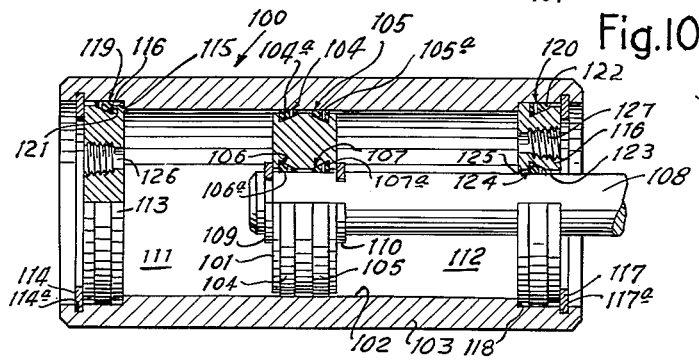
INVENTOR
John V. Fredd
ATTORNEYS

United States Patent Office 3,118,682
Patented Jan. 21, 1964

3,118,682
ELASTIC SEAL WITH EXPANDABLE BACK-UP MEMBER
John V. Fredd, Dallas, Tex., assignor to Otis Engineering Corporation, Dallas, Tex., a corporation of Delaware
Filed May 5, 1961, Ser. No. 108,097
5 Claims. (Cl. 277—170)

This invention relates to sealing devices, and more particularly to sealing devices for effecting a fluid-tight seal between adjacent surfaces.

One object of this invention is to provide a new and improved sealing device.

Another object is to provide an improved sealing device which will engage and seal against rough and irregular surfaces.

Still another object is to provide an improved sealing device which is readily deformable to compensate for eccentricities and irregularities in the surfaces of objects between which it is placed to effect a fluid-tight seal therebetween.

A further object is to provide an improved sealing device for providing a fluid-tight seal between adjacent surfaces, the effectiveness of which is increased as fluid pressure acting against the seal is increased.

A still further object is to provide an improved sealing device having a back-up member which is readily expandable within an annular gap between adjacent surfaces without creating a breach or gap in its periphery so as to conform to the surfaces in sealing relation therewith.

A still further object is to provide an improved sealing device comprising an elastic portion and an expandable back-up member which will enable the device to withstand extreme pressure differentials when sealing between adjacent surfaces and which will prevent the extrusion of the elastic portion of the device by the extreme pressures.

Another object is to provide a sealing device whose sealing elements and the parts between which it cooperates to provide a fluid-tight seal therebetween may be manufactured to large tolerances without impairing the sealing effectiveness of the device.

Still another object is to provide a new and improved expandable sealing device which when in retracted condition and in non-sealing relation to an adjacent surface is resistant to damage by flow of fluids therebetween.

A further object is to provide a new and improved annular sealing device comprising an elastic plastic member and a non-extrusive annular member or back-up ring which when disposed in an annular gap between adjacent surfaces, is readily expandable or contractable in radial directions for movement into or out of sealing relation therewith.

A still further object is to provide a new and improved sealing device which when disposed within a longitudinal gap between adjacent surfaces will resist damage when forced past a lateral port in one of the surfaces while under a load by a pressure differential acting thereon.

A still further object is to provide an improved sealing device for flanged-type connections between flow conductors wherein the sealing device utilizes internal pressures within said conductors to add rigidity to the connection.

Additional objects and advantages of the invention will be readily apparent from the reading of the following description of a device constructed in accordance with the invention, and with reference to the accompanying drawings thereof, wherein:

FIGURE 1 is a fragmentary elevational view, partly in section, showing a sealing device embodying the invention in sealing position between a well packer and a well casing;

FIGURE 2 is an elevational view of the annular back-up ring of the device of FIGURE 1;

FIGURE 3 is a side view of the back-up ring of FIGURE 2;

FIGURE 4 is a sectional view taken along the line 4—4 of FIGURE 2;

FIGURE 5 is a sectional view taken along the line 5—5 of FIGURE 2;

FIGURE 6 is a fragmentary elevational view, partly in section, showing two of the sealing devices in sealing relation between a well packer mandrel and a well casing to provide a fluid-tight seal in both longitudinal directions of the casing;

FIGURE 7 is a view, partly in section, of a hydraulic piston and cylinder apparatus employing a plurality of sealing devices of the invention;

FIGURE 8 is a fragmentary sectional view showing the sealing device of FIGURE 1 in sealing position between a well packer mandrel and a well casing showing the manner in which the sealing device is moved past a lateral flow port of the casing;

FIGURE 9 is a fragmentary elevational view partly in section, of a modified form of the sealing device showing the sealing device in position between a well packer mandrel and a well casing;

FIGURE 10 is a fragmentary elevational view of one of the sealing devices of the piston illustrated in FIGURE 7; and FIGURE 11 is a fragmentary sectional view of a flange-type connection, illustrating the use of still another modified form of the sealing device embodying the invention.

Referring particularly to FIGURES 1 through 6 of the drawings, the sealing device 20 embodying the invention is shown in sealing engagement with the inner surface 21 of a well casing C and the outer surface 23 of a well packer mandrel M.

The sealing device includes an annular resilient seal member or portion 25 and an annular corrugated back-up ring 26 secured thereto by any suitable bonding means. If desired, however, the back-up ring may be molded in the elastic portion, in which case the elastic material would be disposed on both the right and left sides of the ring as seen in FIGURE 1. Also, if desired, the back-up ring may be disposed in abutting relation to the portion 25 without being secured thereto.

The back-up ring 26 is preferably made of relatively hard material such as copper, brass, mild steel, or the like, but it could also be made of non-metallic materials which are not easily extrudable. The width of the ring increases rearwardly toward the resilient member. The ring has a plurality of corrugations 27 which extend longitudinally of the central axis of the ring. The bends or folds 28 and 29 of the corrugations are about axes which lie at an angle to the central axis of the ring although they could be perpendicular to the ring axis. All portions of the outer edge surface 30 of the ring lie in a cylindrical plane and are at uniform radial distance from the ring axis whereas the inner edge surface 31 of the ring lies in a frusto-conical plane.

The outer and inner surfaces 32 and 33 of the narrow bends 28 and of the wide bends 29 of the corrugations preferably lie in planes which are at an angle to the central axis of the ring and parallel to the axes about which the bends and folds are made.

As a result, the bends or folds 28 may move radially outwardly of the bends or folds 29 as the ring is deformed and one set of bends 28 or 29 moves longitudinally or parallel to the central axis of the ring and relative to the other set of bends.

The unique configuration of the back-up ring with its many corrugations 27 imparts a useful degree of resiliency and flexibility to the ring. It is readily expandable and contractable in radial directions relative to the central axis of the ring and is thus easily deformable to assume a wide range of sizes and shapes, both circular and non-circular in form.

In use, the sealing device is disposed between the packer mandrel M and the casing C so that the pressure differential across the sealing device tends to move it to the left relative to the mandrel and will cause the sealing device to be cammed outwardly by the conical cam surface 35 of the mandrel. Thus, for such pressure differentials, the back-up ring is wedged in between the mandrel and the casing to prevent extrusion of the resilient substance of which the resilient element 25 is formed, into or through the annular space 36 therebetween.

The outer edge surface 30 of the back-up ring, since it lies in a cylindrical plane, conforms to and engages the inner wall of the casing, while the internal edge surface 31 of the element which lies in a frusto-conical plane conforms to and engages the frusto-conical surface 35 of the mandrel. Thus, the internal and external edge surfaces of the back-up ring contact the mandrel and casing, respectively, and as the initial seal is effected by the resilient element and the pressure differential across the sealing device increases, the back-up ring is wedged into firmer engagement with the mandrel and casing walls due to the camming engagement of the inner edge surface 31 of the ring with the cam surface of the mandrel.

It will therefore be apparent that the conformity of the external and internal edge surfaces of the back-up ring with the casing and mandrel prevents extrusion of the resilient substance of which the element 25 is formed since no gaps exist between these edge surfaces and the mandrel and the casing. In addition, the corrugations 27 of the back-up ring, which impart resiliency and flexibility to the ring, also provide the back-up ring with great strength to withstand extreme pressure differentials acting thereon. The flexibility of the ring permits it to better conform to the surfaces of the mandrel and the casing which it engages and thus renders the sealing device effective even if eccentricities, out-of-roundness, misalignment, or the like, are present in these surfaces. Accordingly, the sealing device 20 permits greater clearances between the cooperating parts between which it is disposed to effect a fluid-tight seal therebetween and thus permits greater manufacturing tolerances in all of the cooperating parts and in the sealing device itself.

It will be noted that ring 26 is substantially wedge shaped in cross section so that the ring may be wedged tightly between two surfaces. The angle between the inner and outer edge surfaces of the ring may be varied as desired to correspond to the angle between whatever surfaces the sealing device is to be employed.

It will be apparent that the sealing device illustrated in FIGURE 1 can effectively seal if a pressure differential to which it is to be subjected will act thereon in only one longitudinal direction. If it is desired to seal between two elements, such as a packer mandrel and a casing, wherein the pressure differential may occur in either longitudinal direction, two of the sealing devices, 20a and 20b, are mounted on the well packer mandrel M disposed within the well casing C, as shown in FIGURE 6. A conventional seal ring 40 is positioned between the two sealing devices. An annular expander 41, provided with a frusto-conical surface 42, is slidably mounted on the mandrel adjacent the sealing device 20b. When the expander is moved to the left relative to the mandrel, the sealing devices 20a and 20b and the seal ring 40 are forced into sealing engagement with the mandrel and casing by the wedging action imparted to the sealing device 20b by the frusto-conical surface 42 of the expander and by a similar wedging action imparted to the sealing device 20a by the frusto-conical surface 35 of the mandrel. It is thus apparent that should a pressure differential be applied toward the left, as seen in FIGURE 6, across the sealing devices the back-up ring 26a of the sealing device 20a will prevent extrusion of the resilient substance of which the element 25a is formed. In similar manner, should a differential pressure be applied toward the right, as seen in FIGURE 6, across the sealing devices the back-up ring 26b of the sealing device 20b will prevent extrusion of the resilient substance of which the element 25b is formed. The expander 41 of course is held by any suitable means against movement to the right on the mandrel. The conventional sealing ring 40 disposed between the two sealing devices 20a and 20b serves to increase the volume of the elastic material and improve the general sealing qualities of the seal assembly. It is to be understood, however, that the sealing ring is not necessary and may be eliminated, if desired. The sealing or resilient elements should be of sufficient volume, of course, to permit them to conform to the internal surface of the casing and to the external surface of the packer mandrel even though these surfaces may be rough, pitted, or otherwise irregular in shape.

While the sealing device disclosed herein has been described in applications with well tools, it has utility in many other devices. In FIGURE 7, a number of the sealing elements are shown in use in a hydraulic piston and cylinder assembly 100. The piston 101 is slidably mounted for reciprocal movement within the bore 102 of the cylinder 103. The piston, which is in the form of an annular ring, is provided with two external sealing elements 104 and 105 for sealing between the piston and the cylinder. It is also provided with a pair of internal sealing elements 106 and 107 for sealing between the piston and the piston rod 108 on which the annular piston is disposed. The piston is retained on the rod by conventional snap rings 109 and 110 which are received in suitable external grooves of the piston rod. The external sealing devices 104 and 105 are disposed within the external grooves 104a and 105a, respectively, of the piston, and the internal sealing devices 106 and 107 are disposed within the internal grooves 106a and 107a, respectively, of the piston.

The sealing devices 104 to 107, the sealing device 104 of which is illustrated in part in FIGURE 10, each comprises a back-up ring R of the type shown in FIGURE 2 and a resilient element S of rubber, or the like, in which the back-up ring is molded or embedded. The back-up rings of the sealing devices are disposed radially relative to the piston. A differential pressure across the piston acting to the left, as seen in FIGURE 7, will wedge the back-up rings of the sealing devices 105 and 107 and their associated sealing elements S along the frusto-conical surfaces defining the inner ends of the grooves 105a and 107a, thereby effecting a fluid-tight seal between the piston and the cylinder, and between the piston and piston rod, the back-up rings preventing extrusion of the sealing elements. Similarly, a differential pressure acting to the right, as seen in FIGURE 7, will wedge the back-up rings and the sealing elements of the sealing devices 104 and 106 outwardly along the conical surfaces of the grooves 104a and 106a thereby effecting a fluid-tight seal between the piston and the cylinder and between the piston and the piston rod.

It will therefore be apparent that the sealing devices 104 to 107 effectively divide the cylinder into two fluid-tight compartments, 111 and 112. The compartment 111 is closed at one end by the cylinder head 113 which is retained against outward movement from the cylinder 103 by a snap ring 114, the peripheral edge portion of which is disposed within an internal annular groove 114a formed in the inner wall of the cylinder. Inward movement of the cylinder head 113 in the cylinder is limited by the annular shoulder 115. In the same manner, the other end of the compartment 112, is closed by the cylinder head 116. The cylinder head is held against outward movement from the cylinder by a snap ring 117, the peripheral edge portion of which is disposed in the internal annular groove 117a formed in the inner wall of the cylinder. The cylinder head is held against inward movement into the cylinder by the annular shoulder 118 thereof. About each of the cylinder heads 113 and 116 are disposed annular sealing devices 119 and 120, respectively, for sealing between the peripheries of the cylinder heads and the inner wall of the cylinder. The sealing device 119 is disposed in an annular groove of the cylinder head 113 having a conical surface 121. Fluid pressure within the compartment 111 directed outwardly and to the left against the sealing device 119, as viewed in FIGURE 7, causes the back-up ring of the sealing device to be cammed or wedged tightly between the conical surface 121 and the inner wall of the cylinder. Similarly, fluid pressure in compartment 112 which is directed against the sealing device 120, causes the back-up ring thereof to be cammed outwardly and wedged in fluid-tight relation between the conical surface 122 and the inner wall of the cylinder.

The cylinder head 116, having a central opening 123 through which the piston rod 108 extends, is also provided with a sealing device 124 to seal between the piston rod and cylinder head. Fluid pressure within the compartment 112 causes the sealing device 124 to be cammed outwardly and wedged between the piston rod and the conical surface 125 of the internal annular groove of the cylinder head 116 in which the sealing device is disposed.

It will thus be seen that the compartments 111 and 112 are made fluid-tight by the sealing devices about the peripheral surfaces of the cylinder heads, the piston and the piston rod. The cylinder heads 113 and 116 may be provided with threaded openings 126 and 127, respectively, to receive suitable connections or conduits through which fluid may be alternately admitted into and released from the compartments 111 and 112 to produce reciprocation of the piston within the cylinder.

FIGURE 8 shows the sealing device 20 disposed about a well packer mandrel M within a well casing C wherein the back-up ring protects the sealing element from damage by fluid entering the well pipe through a lateral port 60 thereof. The mandrel and the sealing device have been forced to the right to provide communication between the exterior of the well pipe and the annulus 61 between the mandrel and the casing through the port 60. It is assumed that the fluid from the port 60 flows to the left through the annulus 61 wherein the existing pressure is less than that exterior of the pipe and also less than that existing to the right of the device 20. The incoming fluid impinges upon the outer edge of the back-up ring 26 which effectively shields the resilient element 25 of the sealing device to protect it from cutting or erosion by the flowing fluid. The sealing device, of course, can be moved further to the right to more fully uncover the port 60 or can be moved to the left to close the port and stop the flow without being damaged thereby because the flexible back-up ring conforms at its peripheral edge surfaces 30 and 31 to the adjacent surfaces of the mandrel and the well casing. The back-up ring also similarly protects the resilient element of the sealing device when the sealing device is moved in a well casing or other flow conductor past an enlargement in the bore thereof such as a coupling recess or the like.

In the case of well packers, it is extremely important that the outside diameters of the sealing devices and the mandrels be provided with sufficient clearance to assure an ample flow passage between these devices and the mandrel and the well casing to prevent damage thereto as they are lowered through the well casing, especially if the well casing has internal restrictions.

For such use, the streamlined sealing device 50, illustrated in FIGURE 9, is preferred. The sealing device 50 is disposed about the uniform diameter portion of a well packer mandrel M, the frusto-conical surface 51 provided on the forward end of the sealing device helping to guide it past restrictions and obstructions in the well casing C and preventing damage thereto. The back-up ring 52 in this form of the sealing device is of the same configuration as the back-up ring 26, illustrated in FIGURES 1 to 3, and the conical surface 51 of the device corresponds to the peripheral edge 30 of the back-up ring 26. The resilient element portion 53, however, is provided with a uniform cylindrical internal surface 54 and differs from the resilient element 25 of the sealing element of FIGURE 1 whose internal surface has a cylindrical portion and an outwardly extending conical portion. In setting the sealing device 50 in sealing engagement with the mandrel and the casing, it is mechanically moved by suitable means (not shown) into engagement with the frusto-conical surface 55 of the mandrel M, whereupon the back-up ring 52 is wedged into firm engagement with the mandrel and casing and the resilient element 53 is compressed to effect a proper seal.

The sealing device 200 illustrated in FIGURE 11 is employed to seal across a flange-type connection. The sealing device is annular in form and comprises a back-up ring 201 and a resilient seal element 202. The back-up ring 201 is provided with radially directed convolutions or corrugations instead of axial convolutions as in the back-up ring 26. The rings, however, are of substantially the same cross-sectional configuration.

As illustrated in FIGURE 11, the sealing device 200 seals between the surfaces 203 and 204 of members 205 and 206, respectively, which are disposed with their passages 205a and 206a in alignment. The sealing device 200 is disposed in an annular groove formed in the surface 204 of the member 206, in encircling relation to the passageway 206a. The groove is provided with a surface 211 which is perpendicular to the surface 204 and an inclined annular surface 212 which extends outwardly from the surface 211 to the surface 204. It will be apparent that fluid pressures acting on the sealing device 200 will force its back-up ring into firm engagement with the surfaces 203 and 212, which prevents extrusion of the resilient element which now seals between these surfaces. The members 205 and 206 may be held together by any conventional mechanical means; but, due to the effectiveness of the sealing device 200, great securing forces are not required. Consequently, the strict procedures which are conventionally specified for and which should be meticulously followed in making up flanges using conventional gaskets need not be followed in making up flanges using this improved sealing device since excessive initial compression of the sealing device is unnecessary. Therefore, the flange bolts can be smaller and fewer than normally used. The members 205 and 206 need only be held in proximity to one another with sufficient strength to prevent their being separated by internal pressures. Should vibration, temperature changes, or the like, permit the mating parts to separate slightly, the sealing element will be expanded outwardly and wedged by the camming action of the annular surface 212 to maintain the connection rigid as well as to prevent leakage. The particular angle between the inclined surface 212 and the surface 204, of course, may be varied as desired and the upper and lower edges of the sealing devices 200, as viewed in FIGURE 10, varied to correspond thereto.

It will now be seen that a sealing device has been illustrated and described which is provided with a novel back-up or non-extrusion ring which is readily expandable and deformable to conform to regular or irregular surfaces.

It will further be seen that the sealing device is provided with an annular non-extrudable ring having convolutions or corrugations which permit the ring to expand or contract readily and which provides it with great strength to withstand large loads due to extreme pressure differentials. The convolutions or corrugations in the back-up rings of the sealing devices may be radially or axially disposed relative to the central axis of the rings and also may be formed at any angle therebetween as the particular application may require.

It will further be seen that the sealing device is effective to seal across large clearances between cooperating parts, thus permitting greater tolerances in manufacture and consequent reduction in cost.

The foregoing description of the invention is explanatory only, and changes in the details of the construction may be made by those skilled in the art, within the scope of the appended claims, without departing from the spirit of the invention.

What is claimed and desired to be secured by Letters Patent is:

1. A sealing device for sealing a gap between angularly related adjacent annular surfaces comprising: a cylindrical elastic seal member; an imperforate annular metallic member mounted at one end of said elastic seal member in coaxial relation therewith, said annular metallic member having radially extending surfaces provided with convolutions which impart resiliency and flexibility to said annular member whereby said annular metallic member is readily expandable and contractable radially to increase and reduce its circumferential dimension, said metallic member having radially spaced inner and outer circumferential edges which are angularly related in an axial direction thereof to define a wedge converging axially outwardly of said seal member whereby said metallic member may be wedged between said adjacent surfaces to prevent extrusion of said seal member when said sealing device is disposed in said gap and a differential pressure acts across said sealing device in the direction of said metallic member.

2. A sealing device for sealing a gap between angularly related adjacent annular surfaces comprising: a cylindrical elastic seal member having a bore extending therethrough; an imperforate annular ring mounted in abutting engagement with one end of said elastic seal member with the aperture of said ring in communication with said bore, said ring having substantially radially extended corrugations providing convoluted surfaces facing in both axial directions thereof to impart resiliency and flexibility to said ring whereby said ring is readily expandable and contractable radially to increase and reduce the circumferential size of said ring, said ring having radially spaced circumferential inner and outer edge surfaces which are angularly related in an axial direction thereof to define a wedge converging axially outwardly away from said seal member whereby said ring may be wedged between said adjacent surfaces to prevent extrusion of said seal member when said sealing device is disposed in said gap to seal between said adjacent surfaces.

3. A sealing device for sealing a gap between angularly related adjacent annular surfaces of parts joined in a flange-type connection comprising: an annular resilient seal member having a bore extending therethrough; a thin imperforate corrugated metallic back-up member secured to the exterior of said seal member in coaxial sleeved relation therewith, said back-up member having surfaces extending axially thereof and encompassing the periphery of said back-up member, said surfaces being corrugated in a transverse direction radially of the axis of said seal member and back-up member to impart flexibility and resiliency to said back-up member whereby said back-up member is readily expandable and expansible radially of such axis, said back-up member having one transversely extending edge surface and a second edge surface angularly related to said transverse edge surface and converging toward said transverse edge surface to define therewith a wedge, the thin corrugated metallic surface of said back-up member of said wedge constituting the peripheral edge of said sealing device and encompassing the axis of said sealing device.

4. A sealing device comprising: an annular cylindrical elastic seal member; an annular imperforate thin metallic strip providing a back-up member secured to one end of said elastic seal member in coaxial relation therewith, said back-up member having corrugations formed therein disposed transversely of the thin dimension of said strip forming said back-up member and providing therein convolutions which impart resiliency and flexibility to said back-up member whereby said back-up member is readily expandable and contractable radially to increase and reduce its circumferential dimension, said back-up member having radially spaced-opposed inner and outer circumferential edges which are angularly related in an axial direction thereof to define a wedge converging axially thereof longitudinally outwardly of said seal member whereby said back-up member may be wedged between the out-of-round inner surface of a tubular flow conductor and the conical surface of a mandrel disposed in said conductor with the inner and outer edges of the back-up member conforming to said inner and outer surfaces, respectively, when said sealing device is disposed in said gap and a differential pressure exerted across said sealing device in an axial direction of said seal member in the direction of said metallic back-up member.

5. A sealing device for sealing a gap between angularly related adjacent annular surfaces comprising: an annular elastic seal member; an imperforate annular back-up member mounted in abutting engagement with said elastic seal member in coaxial relation therewith, said back-up member being formed of a resilient annular strip formed in corrugations providing convolutions in the major cross-sectional dimension of said strip, said corrugated convolutions imparting resiliency and flexibility to said back-up member whereby said back-up member is readily expandable and contractable radially of the common axis of said back-up member and said seal member, the edges of said back-up member being disposed in planes which are angularly related with respect to each other and substantially vertical to the major cross-sectional dimension of the strip forming said back-up member and converging outwardly away from said seal member to define a wedge, whereby said back-up member may be wedged between said adjacent angularly disposed surfaces to prevent extrusion of said seal member when said sealing device is disposed in said gap between said surfaces and a pressure differential is exerted across said sealing device in the direction of said back-up member.

References Cited in the file of this patent

UNITED STATES PATENTS

| 1,984,806 | Pfefferle | Dec. 18, 1934 |
| 2,066,270 | Hubbard | Dec. 29, 1936 |
| 2,957,717 | Bram | Oct. 25, 1960 |

FOREIGN PATENTS

| 667,968 | Great Britain | Mar. 12, 1952 |